(12) United States Patent
Hinkel

(10) Patent No.: US 6,435,758 B1
(45) Date of Patent: Aug. 20, 2002

(54) CONNECTION ARRANGEMENT FOR COUPLING A HYDRODYNAMIC TORQUE CONVERTER TO A ROTATING SHAFT

(75) Inventor: Rüdiger Hinkel, Röthlein/Heidenfeld (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/506,845

(22) Filed: Feb. 18, 2000

(30) Foreign Application Priority Data

Feb. 18, 1999 (DE) .......................... 199 06 677

(51) Int. Cl.7 ................................ F16B 37/00
(52) U.S. Cl. .................. 403/283; 403/282; 411/181
(58) Field of Search .................. 411/181; 403/283, 403/279, 274, 282

(56) References Cited

U.S. PATENT DOCUMENTS

| | | | | |
|---|---|---|---|---|
| 2,486,769 A | * | 11/1949 | Watson, Jr. | 411/181 X |
| 3,078,900 A | * | 2/1963 | Walker | 411/181 |
| 5,863,164 A | * | 1/1999 | Leistener | 411/181 |

* cited by examiner

Primary Examiner—Lynne H. Browne
Assistant Examiner—John R. Cottingham
(74) Attorney, Agent, or Firm—Cohen, Pontani, Lieberman & Pavane

(57) ABSTRACT

A connection arrangement for coupling a hydrodynamic torque converter to a rotating shaft so that the torque converter is fixed with respect to rotation relative to the rotating shaft includes at least one fastening element arranged at a converter housing. The at least one fastening element is arranged at the converter housing such that a fastening portion of the at least one fastening element meshes or interlocks in a positive engagement with a receiving portion of the converter housing.

10 Claims, 3 Drawing Sheets

CONNECTION ARRANGEMENT FOR COUPLING A HYDRODYNAMIC TORQUE CONVERTER TO A ROTATING SHAFT

BACKGROUND OF THE INVENTION

1. Field of the Invention

The present invention is directed to a connection arrangement for coupling a hydrodynamic torque converter to a rotating shaft so that the hydrodynamic torque converter is fixed with respect to rotation relative to the rotating shaft, the connection arrangement comprising at least one fastening element arranged at a converter housing of the torque converter.

2. Description of the Related Art

A prior art connection arrangement for connecting a hydrodynamic torque converter to a rotating shaft is known, for example, from German reference DE 44 24 989 A1. The accompanying FIG. 3 shows a torque converter 110 with a converter housing 112 having a housing cover 134. A turbine wheel 114—shown schematically—is arranged in the interior of the converter housing 112 so that the turbine wheel 114 is rotatable relative to the converter housing 112. The turbine wheel 114 has a turbine wheel shell 116 and a turbine wheel hub 118 that is coupled or can be coupled in a manner known per se with a driven shaft such, for example, as a transmission input shaft 120, so that it is fixed with respect to rotation relative to the driven shaft. The torque converter 110 also has a lockup clutch 122 with a clutch piston 124 which is displaceable in the axial direction and has a radial outer area 126 on which a friction facing 128 may be arranged which can be pressed against a substantially flat friction surface area 130 at an inner surface 132 of the housing cover 134 of the converter housing 112. Further, a centering pin 136 is secured to the housing cover 134 such, for example, as by welding. The centering pin 136 engages in a centering opening 138 of a rotating shaft 140—shown schematically—and accordingly provides a centering of the torque converter 110 with respect to this rotating shaft 140. The rotating shaft 140 may, for example, comprise a crankshaft of an internal combustion engine. A plurality of fastening elements 44 are secured successively along a circumferential direction about the axis of rotation A by a weld to an outer surface 142 of the converter housing 112 which faces in the axial direction toward the rotating shaft 140. These fastening elements 144 are nut elements with an internal thread 146.

FIG. 3 also shows a connection plate 148 such, for example, as a flex-plate which has openings 150 in a radial inner area. The openings 150 may be penetrated by screw bolts, not shown, to secure the connection plate 148 to the rotating shaft 140. A radially outer area of the connection plate 148 also has an opening 152 associated with each fastening element 144 and through which screws may be screwed into the fastening elements 144 to join the converter housing 112 to the rotating shaft 140 such that it is fixed with respect to rotation relative to it.

In this type of connection arrangement, in which the fastening elements 144 are secured to the converter housing 112 by welding, subsequent machining steps are required after this welding process is carried out to restore the converter housing 112, i.e., the cover 134 thereof, to its desired shape. Welding is prized in the automotive industry for its excellent connection stability. However, because of the heat introduced into the material of the housing cover 134 during the welding process, the housing cover 134 is at least slightly warped. Even the slightest warp cannot be tolerated because housing cover 134 forms the counter-friction surface 130 for the lockup clutch 122. Therefore, a cutting machining step is required to restore exact true running of the cover 134 and housing 112. This cutting machining step increases the number of necessary work steps and impairs strength especially in the region of the surface of the converter housing 112.

SUMMARY OF THE INVENTION

It is the object of the present invention to provide a connection arrangement for coupling a hydrodynamic torque converter to a rotating shaft such that the hydrodynamic torque converter is fixed with respect to rotation relative to the rotating shaft and so that the integrity of the torque converter is not impaired, especially in the region of the converter housing, during the connection process.

According to an embodiment of the present invention, this object is met by a connection arrangement for coupling a hydrodynamic torque converter to a rotating shaft so as to be fixed with respect to rotation relative to it, wherein the connection arrangement comprises at least one fastening element arranged at a converter housing. The at least one fastening element is arranged at the converter housing in that an engagement portion of the at least one fastening element meshes in a positive engagement with a receiving portion of the converter housing.

Accordingly, the present invention produces a positive-locking connection in lieu of the known method of connecting the fastening element and converter housing in a material engagement by welding. As a result, the present invention eliminates the introduction of heat into the material of the converter housing that is required for achieving the material-engagement welding connection. Consequently, the connection arrangement according to the invention does not impair the operating behavior or the integrity of the torque converter in the area of the housing of the torque converter, thereby eliminating the requirement for any additional subsequent machining processes for removing the impermissible deformations of the converter housing caused by the connection process.

In the connection arrangement according to the invention, at least one positive engagement acting in the direction of the rotating shaft is preferably generated between the fastening portion of the at least one fastening element and the fastening portion of the converter housing. For example, the fastening portion of the converter housing may comprise a receiving recess and the fastening portion of the at least one fastening element may comprise an engagement portion which is insertable into the receiving recess.

In a preferred embodiment, the engagement portion of the at least one fastening element is constructed so that it widens toward its free end and has a maximum outer dimensioning, i.e., an outer diameter, which allows for the insertion of the engagement portion into the receiving recess. That is, the engagement portion has a tapering with an increasing diameter toward its free end. Furthermore, a deformation area is provided at the at least one fastening element, wherein, when the engagement portion engages at least partially in the receiving recess, the deformation area acts in at least some areas on the material area of the converter housing surrounding the receiving recess and deforms this material area in such a way that it engages behind the tapering engagement portion. Accordingly, it is necessary only to push the engagement portion of the at least one fastening element into the respective receiving recess and to press the fastening element into this receiving recess, wherein the positive engagement arrangement is formed automatically due to the configuration of the fastening element.

To minimize the impairment to the stability of the converter housing and to prevent the occurrence of sealing problems in the torque converter, the receiving recess associated with the at least one fastening element comprises a recess in the form of a pocket hole which is open toward the outside of the converter housing.

To achieve a stable positive-locking engagement, the at least one fastening element may be formed from metal, sintered material or a combination material, for example, a rubber-metal combination.

Further, the connection arrangement according to the invention may comprise a plurality of fastening elements arranged successively in a circumferential direction about an axis of rotation.

The present invention is also directed to a hydrodynamic torque converter with the connection arrangement described above.

The present invention is also directed to a process for providing a connection arrangement at a hydrodynamic torque converter, wherein the process comprises the following steps:

a) providing at least one receiving recess at an outer surface of a converter housing;

b) inserting an engagement portion of a fastening element into the receiving recess, which engagement portion includes a tapered portion that widens toward a free end; and c) causing a deformation of a material area of the converter housing surrounding at least one receiving recess after at least partial insertion of the engagement portion in the receiving recess, which deformation is carried out such that the material area engages behind the tapered portion, thereby creating the positive-locking engagement.

Step a) includes providing the at least one receiving recess by pressing, stamping or the like.

Further, in the process according to the invention, step c) may comprise pressing the fastening element into the receiving recess and, in so doing, deforming the material area of the converter housing surrounding the receiving recess by a deformation area provided at the fastening element.

The process according to the invention is preferably performed for a plurality of receiving recesses.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIGS. 2a and 2b show sectional views of the connection arrangement according to further embodiments of the present invention, wherein FIG. 2a shows an initial phase of the insertion of a fastening element into the converter housing and FIG. 2b shows the fastening element after the conclusion of the insertion process.

DETAILED DESCRIPTION OF THE PRESENTLY PREFERRED EMBODIMENTS

Figure 3:
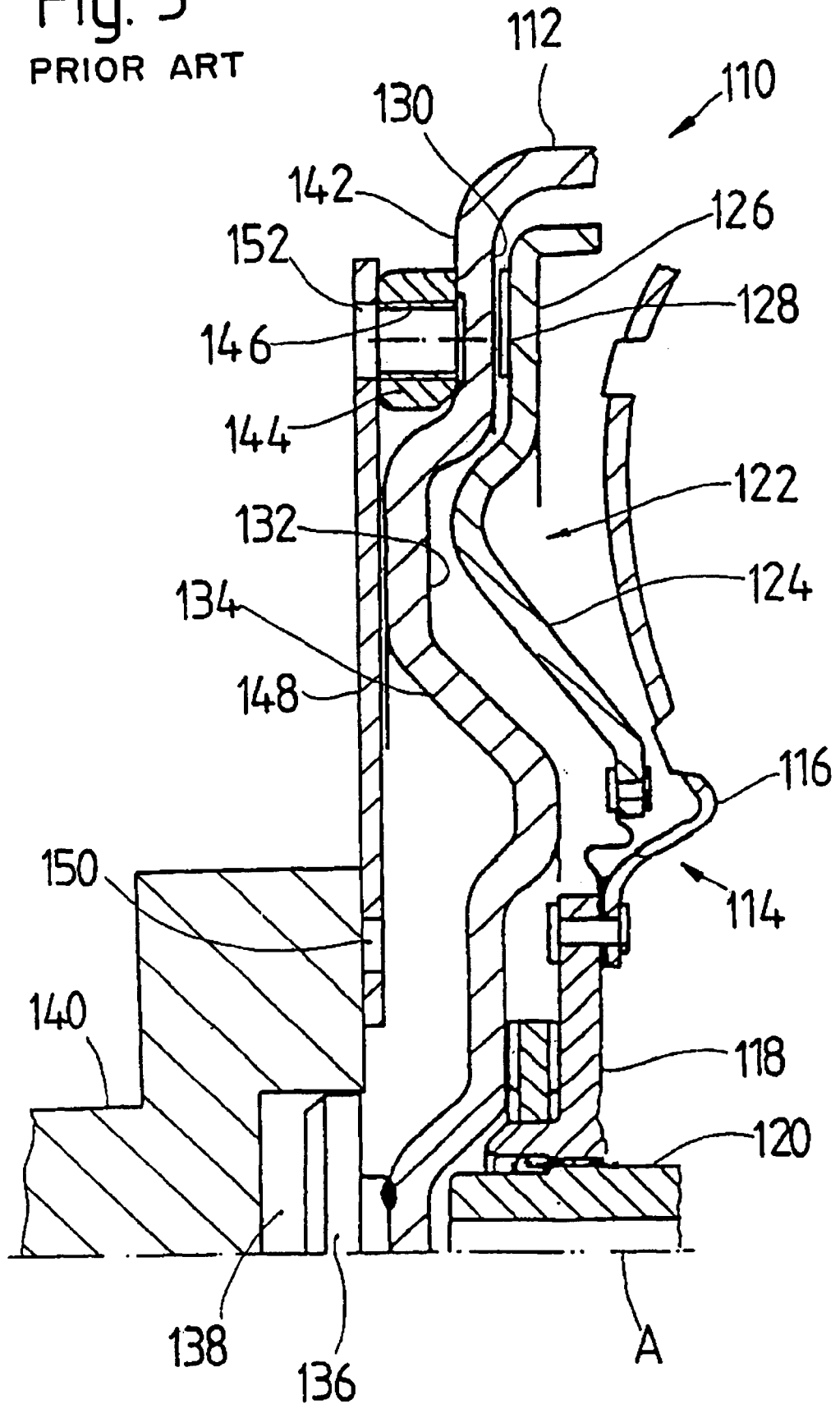
FIG. 3 shows a simplified partial longitudinal section through a torque converter of the prior art coupled to a rotating shaft.

A detailed description of the basic construction of a torque converter 110 and the manner in which the torque converter is joined to a rotating shaft 140 has already been given above with reference to FIG. 3. It should be added that, of course, the torque converter 110 comprises an impeller wheel—not shown in the drawing—which is coupled with the housing so as to be fixed with respect to rotation relative to it and a stator wheel between the turbine wheel and the impeller wheel.

Figure 1:
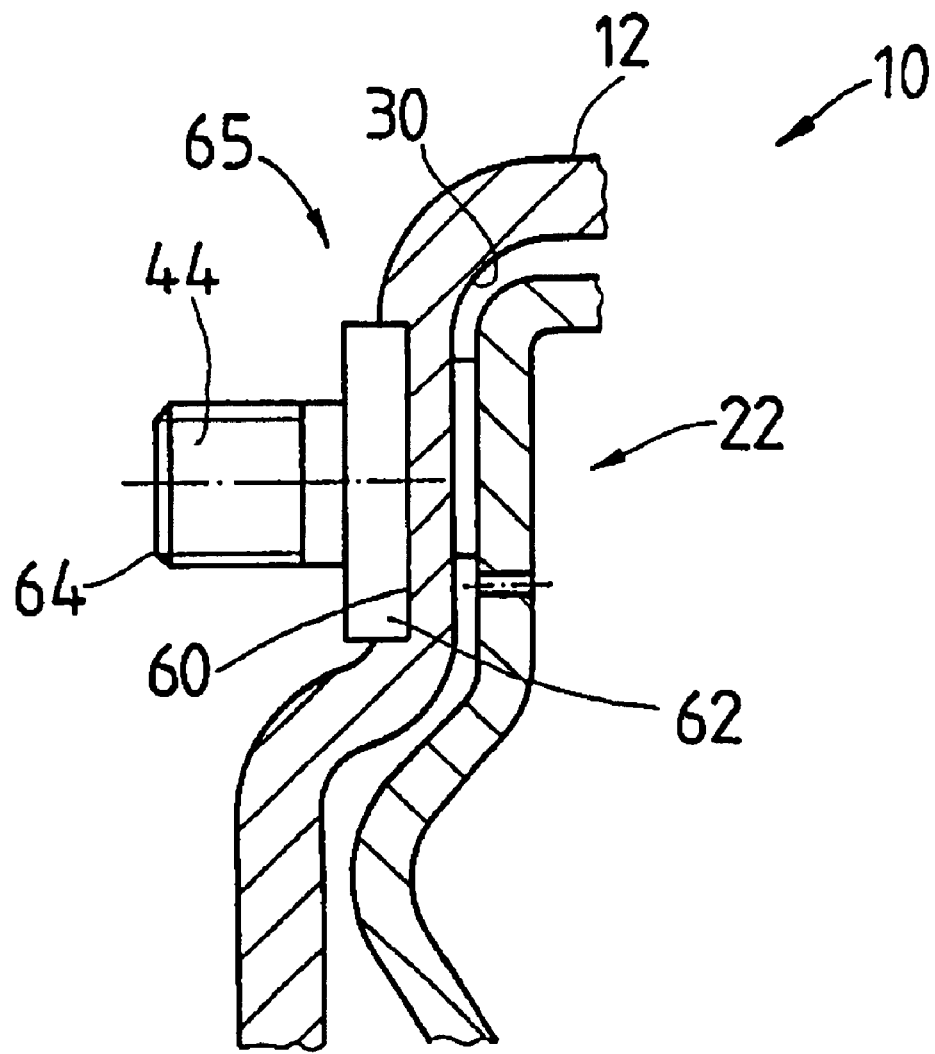
FIG. 1 shows a partial longitudinal section through a connection arrangement at a torque converter according to an embodiment of the present invention.

FIGS. 1 and 2 show detailed views of a connection arrangement 65 for connecting a torque converter 10 to a rotating shaft—not shown in FIGS. 1 and 2—according to an embodiment of the present invention. The torque converter 10 is similar to the prior art torque converter 110 shown in FIG. 3 and includes a converter housing 12 with a housing cover 34. Furthermore, the torque converter 10 also includes a lockup clutch 22 which is axially movable and may be pressed against a counter friction surface 30 of the housing cover 34.

Referring now to FIG. 1, a receiving portion comprising a depression or receiving recess 60 shaped as pocket hole is formed in a substantially radially extending portion of the housing cover 34 of the converter housing 12. A plurality of receiving recesses 60 may be formed successively in the circumferential direction about an axis of rotation. These receiving recesses 60 may, for example, be produced prior to or after the deep-drawing process for the converter housing 12 by pressing in, stamping in or possibly by cutting out. A fastening element 44 is inserted into each of these receiving recesses 60, wherein the torque converter is then coupled, for example, with a flex-plate—such as the flex-plate 148 shown in FIG. 3—or the like via the fastening element 44 and thereby may be joined to a rotating shaft such, for example, as a crankshaft. For this purpose, the fastening element 44 comprises an engagement portion 62 which is only shown schematically in FIG. 1 and is described in more detail in the following with reference to FIG. 2. The fastening element 44 also has a coupling portion 64 which is likewise shown only schematically in FIG. 1 and is described in more detail with reference to FIG. 2.

Figure 2A:
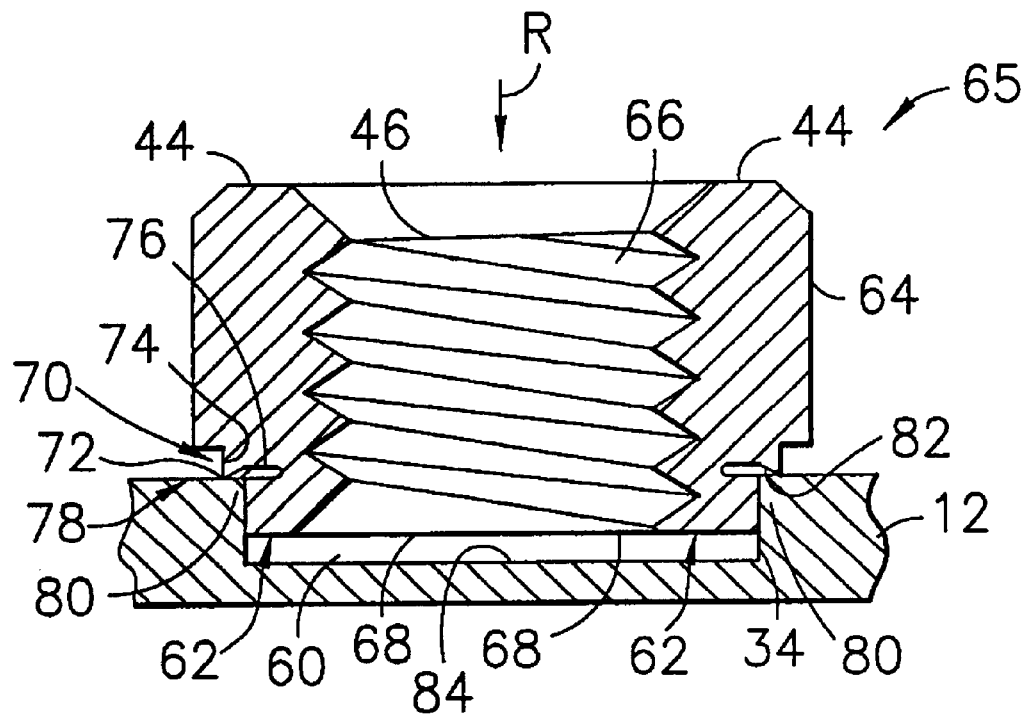
Figure 2B:
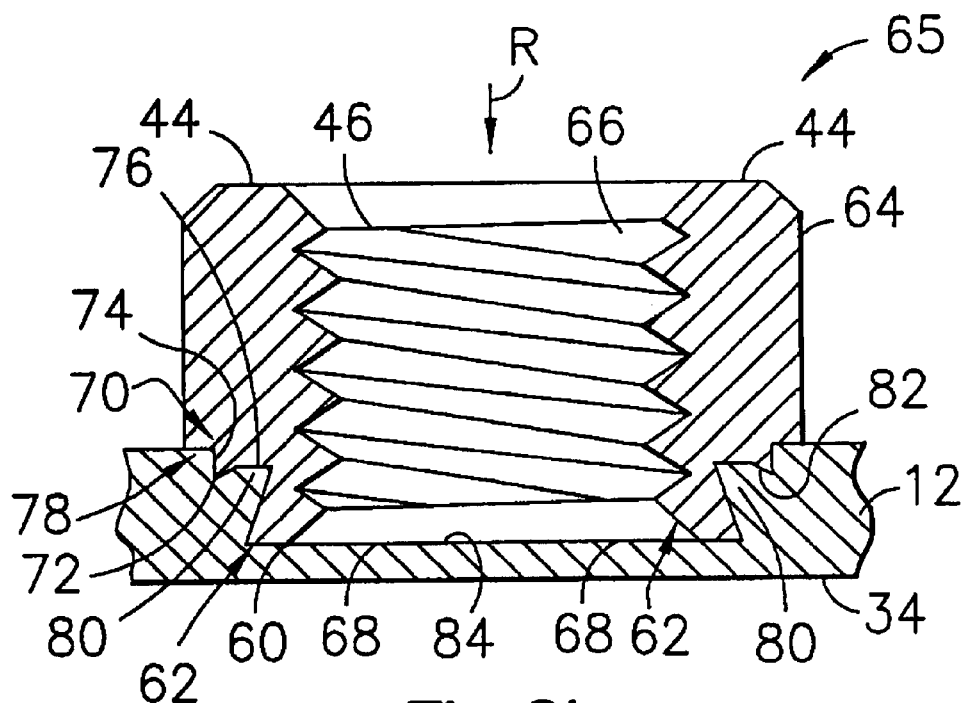

Referring now to FIGS. 2a and 2b, the coupling portion 64 of the fastening element 44 has an internal threaded opening 66. Screws penetrating the connection plate may be screwed into the internal threaded opening 66 as was described above with reference to FIG. 3. However, it is noted that it is likewise possible, as is indicated in FIG. 1, to construct this coupling portion 64 as an external thread or screw portion which is guided through an opening into the connection plate and onto which a nut element may be screwed from the other side.

The engagement portion 62 of the connection element 44 is constructed such that it widens toward a free end 68 in the direction of the longitudinal axis of the internal threaded opening 66. Accordingly, a configuration is formed in the longitudinal section of the fastening element 44 which widens in a dovetail-shaped manner (See FIG. 2b). However, this truncated surface shaping need not necessarily be provided; a bent surface configuration may also be realized (See FIG. 2a).

A deformation area 70 is formed at the fastening element and adjoins the area of the engagement portion 62 that forms the smallest diameter. The deformation area 70 preferably completely surrounds this area of the smallest diameter in the circumferential direction. A deformation cutter 72 is formed in the deformation area 70 and faces the free end 68 of the engagement portion 62. The deformation cutter is formed at the transition between a cylindrical surface 74 extending substantially in the longitudinal direction of the connection element 44 and a surface 76 extending substantially transverse thereto.

As can be seen particularly in FIG. 2*a*, the outer dimensioning of the engagement portion 62, that is, for example, its outer diameter with respect to a circular configuration, is adapted to the inner dimensioning of the receiving recess 60 so that the engagement portion 62 may be introduced into this receiving recess 60 substantially without hindrance in insertion direction R in an initial phase of the assembly process. This substantially unhindered insertion movement continues until the deformation cutter 72 contacts a material area 78 of the converter housing 12 or housing cover 34 surrounding the receiving recess 60. When the fastening element 44 is pressed farther into the receiving recess 60 in direction R accompanied by the application of force, the deformation cutter 72 cuts into the material area 78 of the housing cover 34 circularly around the receiving recess 60 and presses the material portion 80 located between the deformation cutter 72 and the inner surface of the receiving recess 60 toward the interior of the receiving recess 60. The pressing of the material portion 80 toward the interior of the receiving recess 60 is facilitated by an inclined surface or an approximately circularly curved rejection surface 82 in the area of transition into surface 76 of the deformation cutter 72.

By continuing to press the fastening element 44 in direction R, that is, as the cutter 72 progressively cuts into the material area 78, the material of the housing cover 34 is increasingly displaced radially inward with respect to the longitudinal center axis of the connection element 44 (corresponding to arrow R in FIGS. 2*a* and 2*b*), so that the material 80 engages behind the engagement portion 62 which widens toward the free end 68.

In the completely inserted state of the connection element 44, that is, when the surface 76 abuts at the surface of the housing cover 12 and/or when the free end 68 abuts at a base 84 of the receiving recess 60, the undercut space formed by the widening configuration of the engagement portion 62 is entirely filled by the material 80. This means that this material area 80 engages behind the widening engagement portion 62 in the fully inserted state of the fastening element 44 as is shown in FIG. 2*b* and accordingly, along with the engagement portion 62, forms an engagement arrangement acting in a positive-locking manner in the longitudinal direction of the connection element 44 which generally corresponds to the direction of the axis of rotation.

Since this positive-locking engagement arrangement is formed in the circumferential direction around the longitudinal center axis of every connection element 44, preferably around the circumference, a very stable connection is created which provides the connecting strength required in this region. To improve the connection between the fastening elements 44 and the housing cover 34, wherein the fastening elements 44 are fixed with respect to rotation relative to the housing cover 34, it is possible to construct the engagement portion 62 and consequently also the receiving recess 62 in an angular or elliptical shape rather than with a circular configuration, so that a positive-locking coupling of these two components is also provided in the circumferential direction of the fastening element 44.

It is noted that the housing cover 34 may be supported at its inner surface while the pressing in process is being carried out to prevent a bending of the housing cover caused by the pressing in process. Accordingly, no additional cutting machining processes need to be carried out during production of the converter housing as is required when fastening elements are welded in the radial outer area. It is further noted that the production process for the housing cover may also include securing or providing the centering pin at this housing cover, wherein the centering pin may, for example, comprise an integral part of the cover (by a drawing process) or the centering pin may be welded to the cover. The welding of the centering pin with the cover has only a slight influence on the integrity and shaping of the cover because it is welded in a very localized radial inner area at which no other components engage so as to exert friction as occurs in the radial outer area which is constructed to cooperate with the lockup clutch.

Further, it is also noted that the receiving recesses 60 are preferably generated as pocket-hole openings by stamping or pressing, so that no sealing problems occur in this area and no discontinuities are generated at the inner surface of the housing cover.

The fastening elements 44, e.g., as shown in FIGS. 2*a* and 2*b*, are available from Penn Engineering & Manufacturing Corporation, for example, via the company König Verbindungstechnik. It has been shown that fastening elements of the type mentioned above, known as PEM press-in fasteners, may be advantageously be used in torque converters because tests have shown that these fastening elements provide the required connection strength. It is further possible to adapt to determined connection plates or the like axially and radially through the shaping of the elements.

The invention is not limited by the embodiments described above which are presented as examples only but can be modified in various ways within the scope of protection defined by the appended patent claims.

I claim:

1. In a hydrodynamic torque converter, a connection arrangement for coupling a converter housing of the hydrodynamic torque converter to a rotating shaft so that the torque converter is fixed with respect to rotation relative to the rotating shaft, the connection arrangement comprising a receiving portion arranged on the converter housing of the torque converter and a fastening element having an engagement portion, wherein said engagement portion is connectable via an interlocked positive-locking engagement with said receiving portion, and wherein said receiving portion of the converter housing includes a receiving recess comprising a pocket hole having a blind end and an open end open toward an outside of the converter housing, and said engagement portion of said fastening elements has a free end that is insertable into said receiving recess.

2. The connection arrangement of claim 1, wherein said interlocked positive-locking engagement acts along the longitudinal direction of the rotating shaft and is generated between said fastening portion of said fastening element and said receiving portion of the converter housing.

3. The connection arrangement of claim 1, wherein said engagement portion comprises a tapered portion that tapers outwardly toward said free end and has a maximum outer dimension allowing insertion of said engagement portion into said receiving recess, and said fastening element further comprises a deformation area facing said free end and arranged such that when said engagement portion engages at least partially in said receiving recess, said deformation area deforms at least some areas of a material area of the converter housing surrounding said receiving recess thereby forming a deformed material area, wherein said deformed material area engages behind said tapered portion thereby creating said interlocked positive-locking engagement.

4. The connection arrangement of claim 1, wherein said fastening element is formed from a sintered material.

5. The connection arrangement of claim 1, comprising a plurality of fastening elements arranged successively along a circumferential direction about an axis of rotation of the torque converter.

6. A hydrodynamic torque converter comprising a connection arrangement for coupling a converter housing of the hydrodynamic torque converter to a rotating shaft so that the torque converter is fixed with respect to rotation relative to the rotating shaft, the connection arrangement comprising a receiving portion arranged on the converter housing of the torque converter and a fastening element having an engagement portion, wherein said engagement portion is connectable via an interlocked positive-locking engagement with said receiving portion, and wherein said receiving portion of the converter housing includes a receiving recess comprising a pocket hole having a blind end and an open end open toward an outside of the converter housing, and said engagement portion of said fastening element has a free end that is insertable into said receiving recess.

7. A process for providing a connection arrangement for coupling a converter housing of a hydrodynamic torque converter to a rotating shaft such that the torque converter is fixed with respect to rotation relative to the rotating shaft, said process comprising the steps of:

a. arranging a receiving recess comprising a pocket hole on an outer surface of the converter housing said pocket hole having a blind end and an open end open toward an outside of the converter housing;

b. inserting an engagement portion of a fastening element into said receiving recess, said engagement portion having a free end and a tapered portion widening toward said free end; and c. deforming a material area of the converter housing surrounding said receiving recess after said engagement portion is at least partially inserted by said step b. such that the material area being deformed engages behind the tapered portion of the engagement portion, thereby forming an interlocked positive-locking engagement.

8. The process of claim 7, wherein said step a comprises arranging the receiving recess by one of pressing and stamping.

9. The process of claim 7, wherein said step c. comprises pressing the fastening element into said receiving recess such that a deformation area on the fastening element deforms the material area of the converter housing surrounding the receiving recess.

10. The process of claim 7, wherein said steps a. through c. are performed for a plurality of receiving recesses arranged along a circumferential direction on the housing cover.

* * * * *